(12) United States Patent  
Heron

(10) Patent No.: US 9,414,715 B2
(45) Date of Patent: Aug. 16, 2016

(54) UNIVERSAL POT COVER HOLDER/LID HOLDER WITH SPOON REST

(71) Applicant: David Wayne Heron, Brooklyn, NY (US)

(72) Inventor: David Wayne Heron, Brooklyn, NY (US)

( * ) Notice: Subject to any disclaimer, the term of this patent is extended or adjusted under 35 U.S.C. 154(b) by 106 days.

(21) Appl. No.: 14/515,523

(22) Filed: Oct. 16, 2014

(65) Prior Publication Data

US 2016/0106266 A1    Apr. 21, 2016

(51) Int. Cl.
| | |
|---|---|
| *A47G 19/08* | (2006.01) |
| *A47J 45/00* | (2006.01) |
| *A47J 43/07* | (2006.01) |
| *A47J 47/16* | (2006.01) |
| *A47F 5/01* | (2006.01) |

(52) U.S. Cl.
CPC .............. *A47J 45/00* (2013.01); *A47J 43/0727* (2013.01); *A47F 5/01* (2013.01); *A47J 47/16* (2013.01)

(58) Field of Classification Search
CPC ....... A47J 45/00; A47J 43/0727; A47J 47/16; A47F 5/01
USPC .............. 211/181.1, 41.11, 41.2, 41.4, 133.2, 211/85.31, 133.5; 248/176.1, 176.2, 121, 248/127, 688
See application file for complete search history.

(56) References Cited

U.S. PATENT DOCUMENTS

| | | | | | |
|---|---|---|---|---|---|
| RE4,657 | E | * | 12/1871 | Latham ...................... | 211/181.1 |
| 138,538 | A | * | 5/1873 | Sherwood .............. | F16M 11/00 211/181.1 |
| 241,454 | A | * | 5/1881 | Van Eps ................. | A47G 7/044 211/181.1 |
| 490,851 | A | * | 1/1893 | Jones ....................... | A47K 1/09 211/181.1 |
| D27,014 | S | * | 5/1897 | Sully ................................. | 211/1 |
| D28,771 | S | * | 5/1898 | Mills ................................. | 211/1 |
| 940,812 | A | * | 11/1909 | Herman .................... | A47F 7/08 211/181.1 |
| 1,237,010 | A | * | 8/1917 | Adams ............... | G11B 33/0483 211/181.1 |
| 1,514,375 | A | * | 11/1924 | Crimmel ................. | A47J 47/16 211/181.1 |
| 2,225,681 | A | * | 12/1940 | Braun ...................... | A01G 5/00 211/181.1 |
| 2,517,244 | A | * | 8/1950 | Rundell ................... | A47J 47/16 211/181.1 |
| 2,552,983 | A | * | 5/1951 | Lee .......................... | A61L 2/26 211/181.1 |

(Continued)

FOREIGN PATENT DOCUMENTS

JP       2012045344 A * 3/2012 .............. A47J 47/16

*Primary Examiner* — Joshua J Michener
*Assistant Examiner* — Devin Barnett

(57) ABSTRACT

A universal pot cover holder with spoon rest is an apparatus capable of placing hot dripping pot covers without having them on the counter top. A unit that sits the pot cover upright and also can accommodate up to two pot covers at same time and two stirring spoons. A unit that will bring organization around the stove, eliminate counter mess, accommodates any pot cover with any knob or handle. Unit is one continuous welded apparatus with the exception of a removable glass bowl.

7 Claims, 5 Drawing Sheets

(56) References Cited

U.S. PATENT DOCUMENTS

| | | | | |
|---|---|---|---|---|
| 2,553,764 A * | 5/1951 | Hawkins | A47J 47/16 | 211/181.1 |
| 2,632,320 A * | 3/1953 | Liss | A47G 23/0225 | 248/311.2 |
| 3,036,750 A * | 5/1962 | Lombardi | A45F 5/10 | 211/181.1 |
| 3,532,225 A * | 10/1970 | Reed | A47B 13/02 | 211/181.1 |
| 3,568,969 A * | 3/1971 | Boman | A47J 45/02 | 211/181.1 |
| 3,693,808 A * | 9/1972 | Rauch | A47F 5/13 | 135/67 |
| 3,759,505 A * | 9/1973 | Callanan | H02G 3/125 | 211/85.31 |
| 4,106,736 A * | 8/1978 | Becker, III | A47F 5/01 | 211/103 |
| 4,333,623 A * | 6/1982 | May | B05C 17/00523 | 248/117.2 |
| 4,572,379 A * | 2/1986 | Wallo | A47F 7/143 | 211/181.1 |
| 4,836,392 A * | 6/1989 | Constantino | A47L 15/505 | 211/133.5 |
| 5,016,847 A * | 5/1991 | Herzig | A47F 5/01 | 211/181.1 |
| D317,845 S * | 7/1991 | Wolff | D7/637 | |
| 5,127,616 A * | 7/1992 | Carney | A47J 47/16 | 211/41.11 |
| 5,435,295 A * | 7/1995 | Gerrard | F24B 1/193 | 126/152 B |
| D408,229 S * | 4/1999 | Hong | D7/601 | |
| D419,385 S * | 1/2000 | Send, Jr. | D7/601 | |
| 6,012,593 A * | 1/2000 | Knittel | A47J 47/16 | 211/181.1 |
| 6,299,003 B1 * | 10/2001 | Osorio | A47L 15/505 | 211/181.1 |
| 6,505,746 B1 * | 1/2003 | Johnson | A47J 47/16 | 211/70.7 |
| D473,759 S * | 4/2003 | Paul | D7/601 | |
| D476,847 S * | 7/2003 | Kingsley | D7/388 | |
| 6,604,639 B2 * | 8/2003 | Chen | A47F 7/00 | 211/41.2 |
| 6,827,006 B1 * | 12/2004 | D'Amato | A47J 43/18 | 211/181.1 |
| D517,870 S * | 3/2006 | Perkins | D7/637 | |
| D539,102 S * | 3/2007 | Goodman | D7/601 | |
| D547,619 S * | 7/2007 | Goodman | D7/637 | |
| 7,281,469 B1 * | 10/2007 | Barbour | A47J 43/18 | 211/181.1 |
| D608,597 S * | 1/2010 | Goodman | D7/600.1 | |
| D626,383 S * | 11/2010 | Kulkey | D7/637 | |
| 7,959,020 B2 * | 6/2011 | Rosen | D06F 79/02 | 211/106 |
| D648,184 S * | 11/2011 | Goodman | D7/601 | |
| D669,636 S * | 10/2012 | Goodman | D28/38 | |
| D671,371 S * | 11/2012 | Goodman | D7/601 | |
| 8,479,926 B1 * | 7/2013 | Blaisdell | A47J 47/16 | 211/181.1 |
| 8,561,957 B2 * | 10/2013 | Levine | A47J 36/34 | 220/573.1 |
| 8,621,988 B1 * | 1/2014 | O'Dea | A47J 43/18 | 211/181.1 |
| 8,701,899 B2 * | 4/2014 | Paga | A47F 5/01 | 211/181.1 |
| D716,106 S * | 10/2014 | Goodman | D7/601 | |
| 8,931,649 B2 * | 1/2015 | Chen | A47B 81/007 | 211/181.1 |
| D722,250 S * | 2/2015 | Borovicka | D7/409 | |
| D744,297 S * | 12/2015 | Goodman | D7/637 | |
| D747,155 S * | 1/2016 | Goodman | D7/601 | |
| D748,439 S * | 2/2016 | Goodman | D7/601 | |
| D751,765 S * | 3/2016 | Goodman | D28/73 | |
| 2004/0251222 A1 * | 12/2004 | Ohanian | A47J 47/16 | 211/41.11 |
| 2006/0261021 A1 * | 11/2006 | Stagnaro | A47J 47/16 | 211/119 |
| 2007/0295675 A1 * | 12/2007 | Anker | A47J 47/16 | 211/31 |
| 2013/0092647 A1 * | 4/2013 | Chen | A47F 1/082 | 211/181.1 |
| 2014/0008315 A1 * | 1/2014 | Elly | A47J 36/12 | 211/41.11 |
| 2015/0014495 A1 * | 1/2015 | Bausman | A47J 47/16 | 248/176.2 |
| 2016/0029852 A1 * | 2/2016 | Ljung | A47J 47/16 | 211/41.11 |

\* cited by examiner

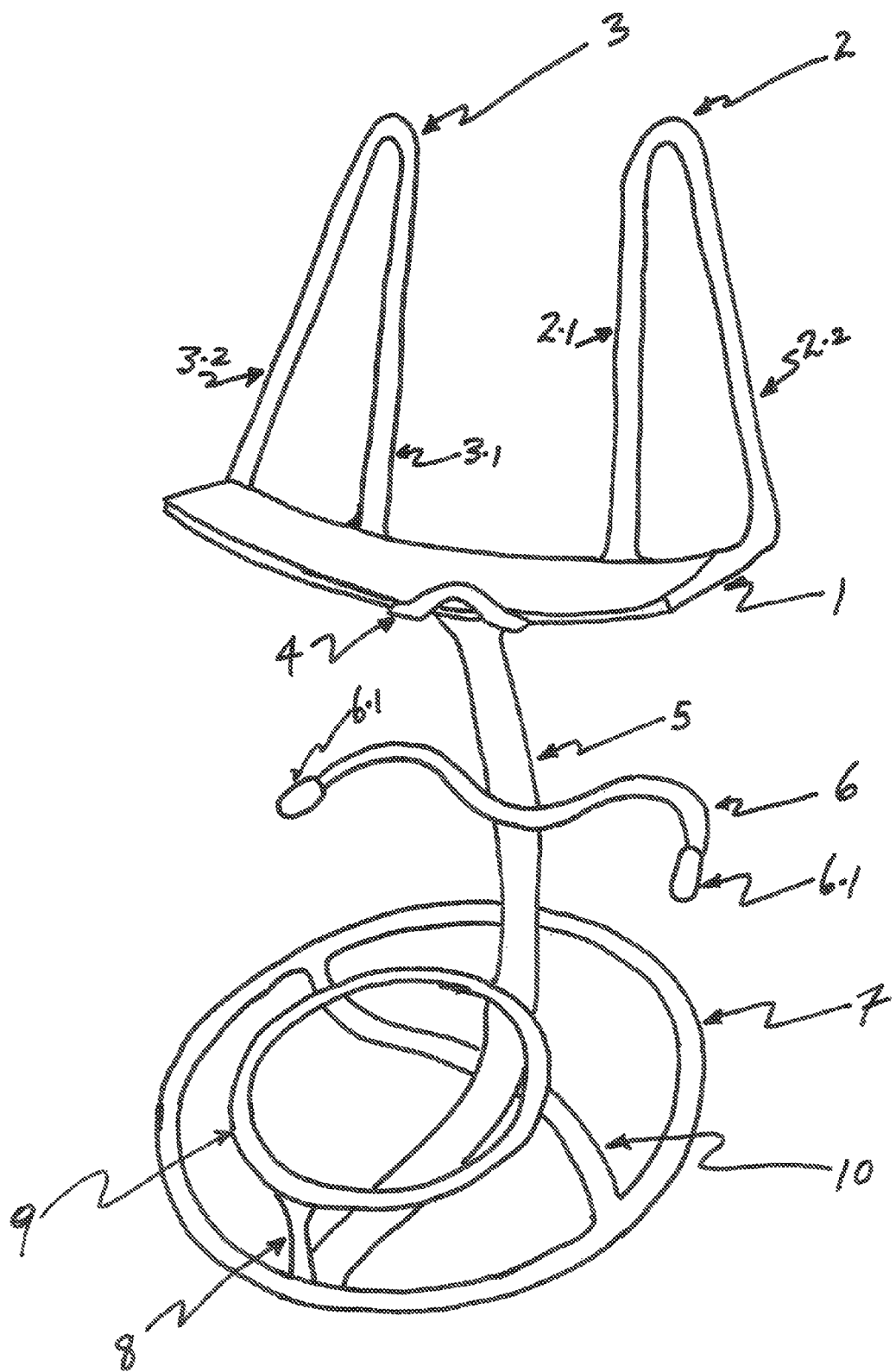
FIG. 1 - FRONTAL VIEW

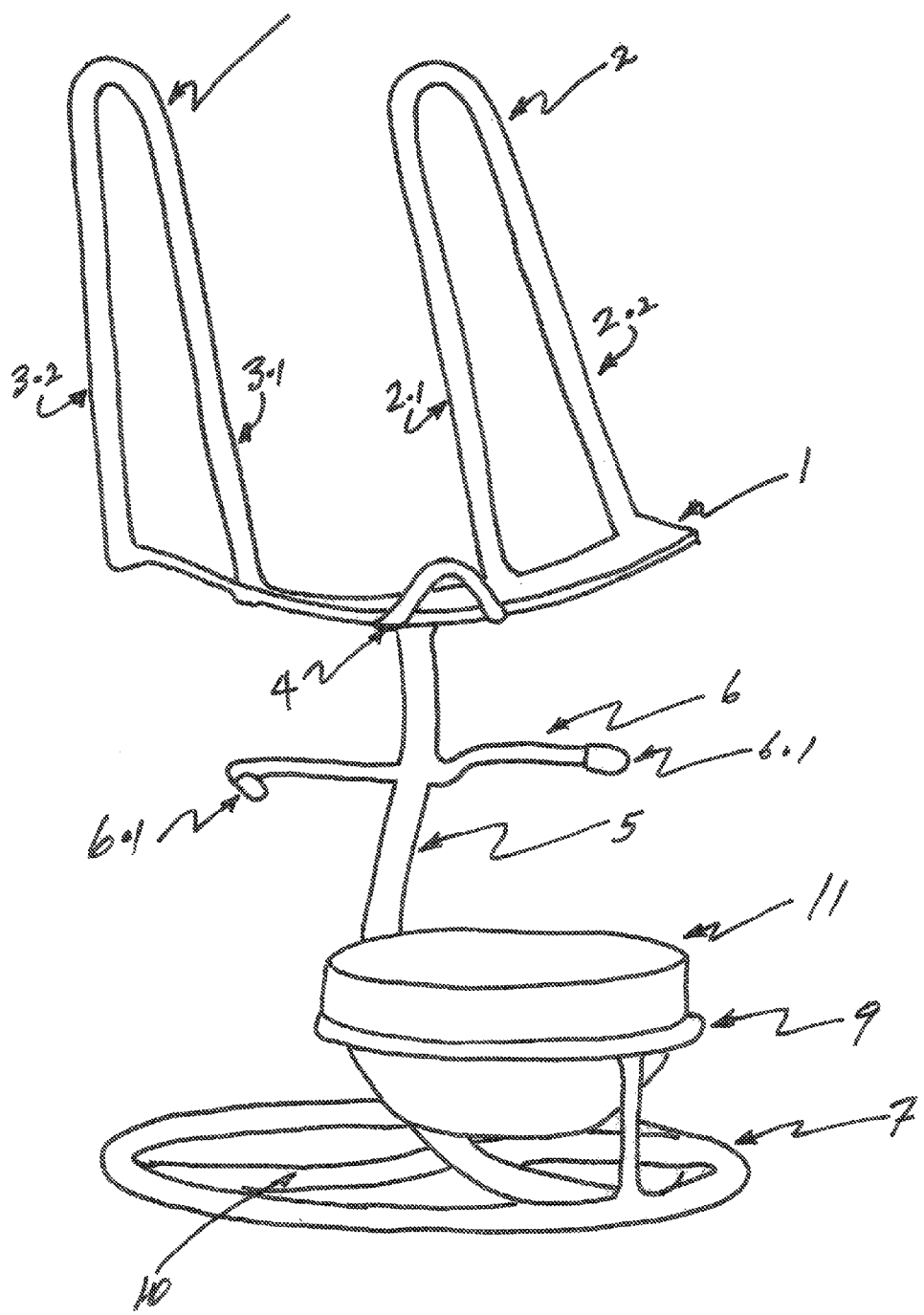
FIG. 2 – ANGULAR FRONTAL VIEW

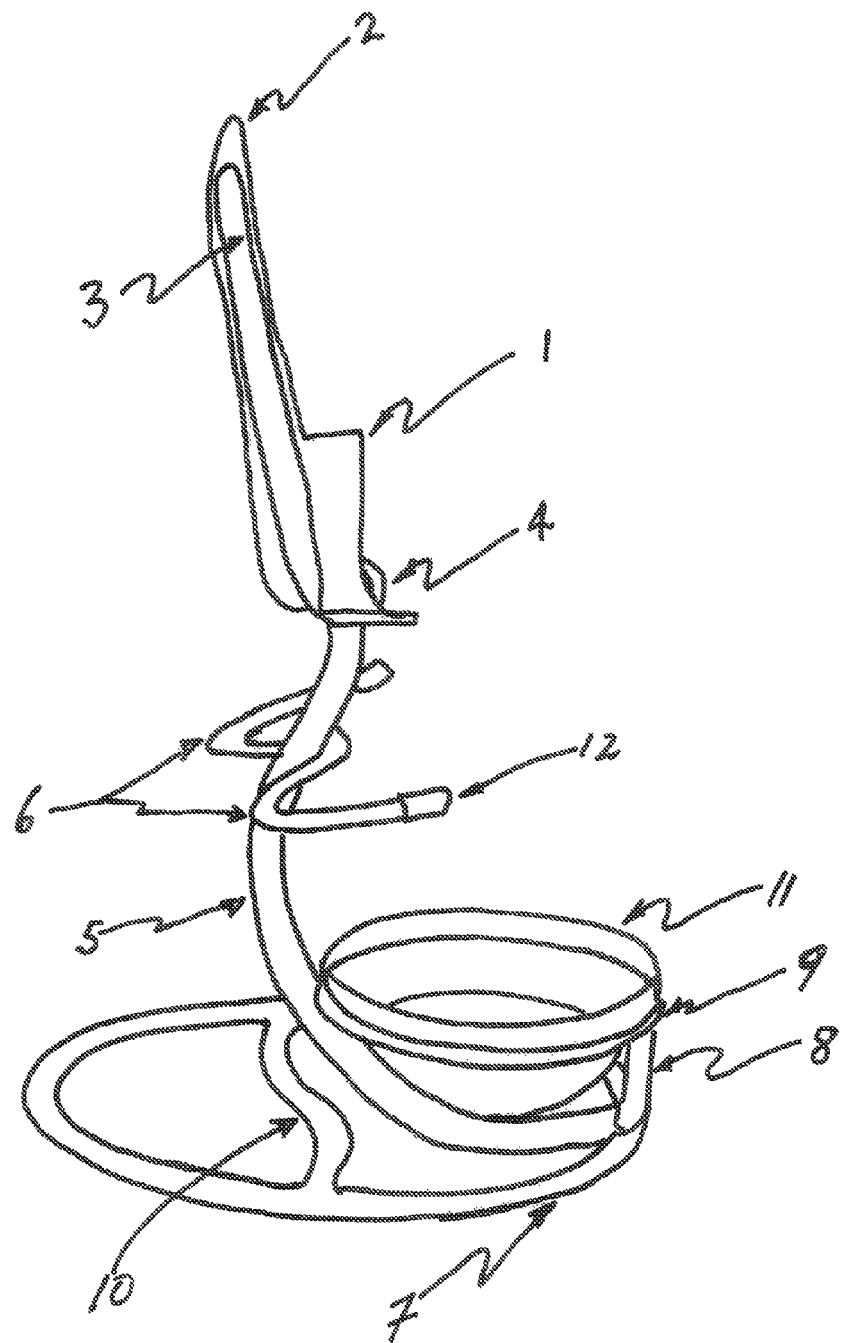
FIG. 3 - SIDE VIEW

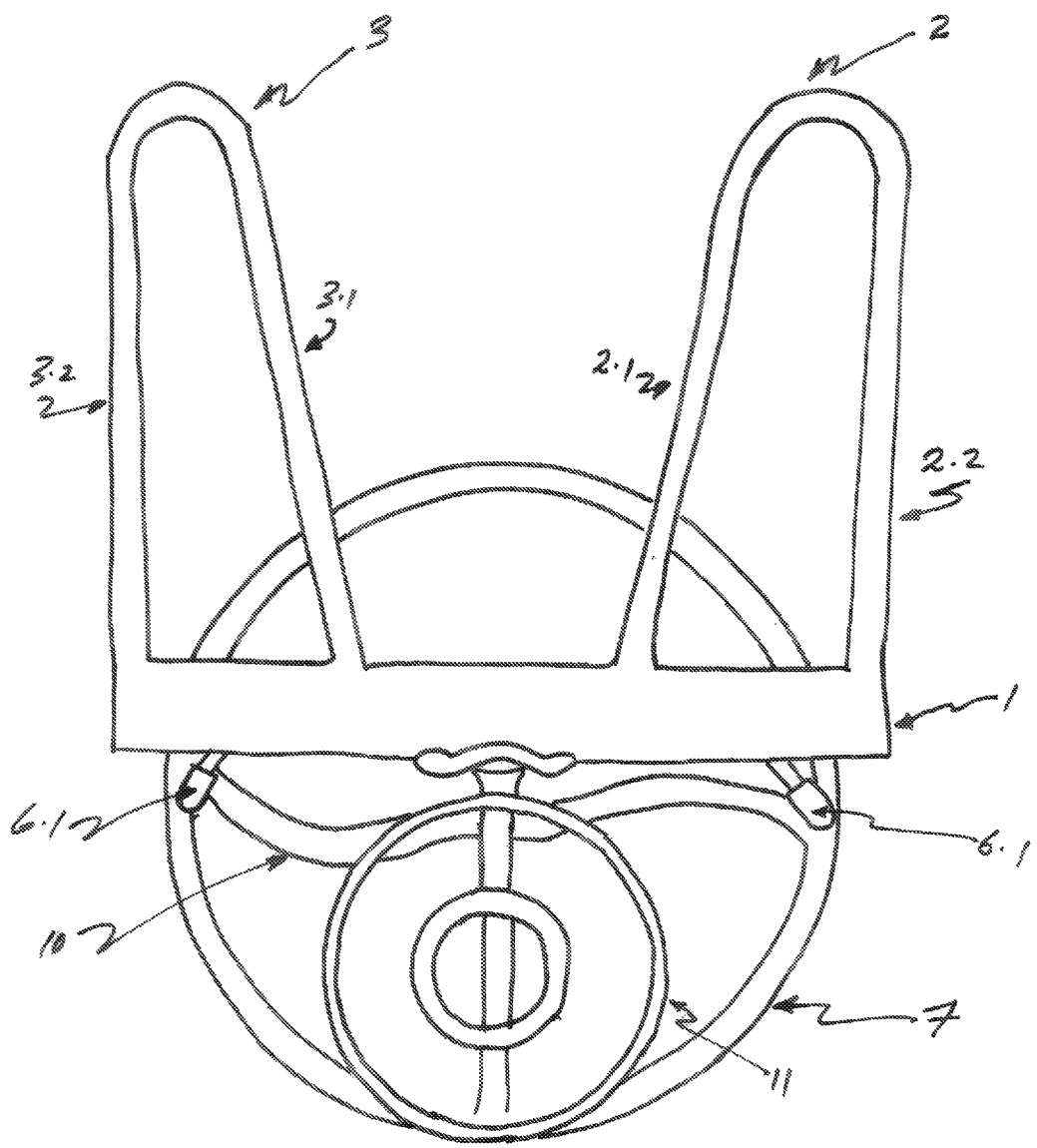
FIG. 4 - TOP VIEW

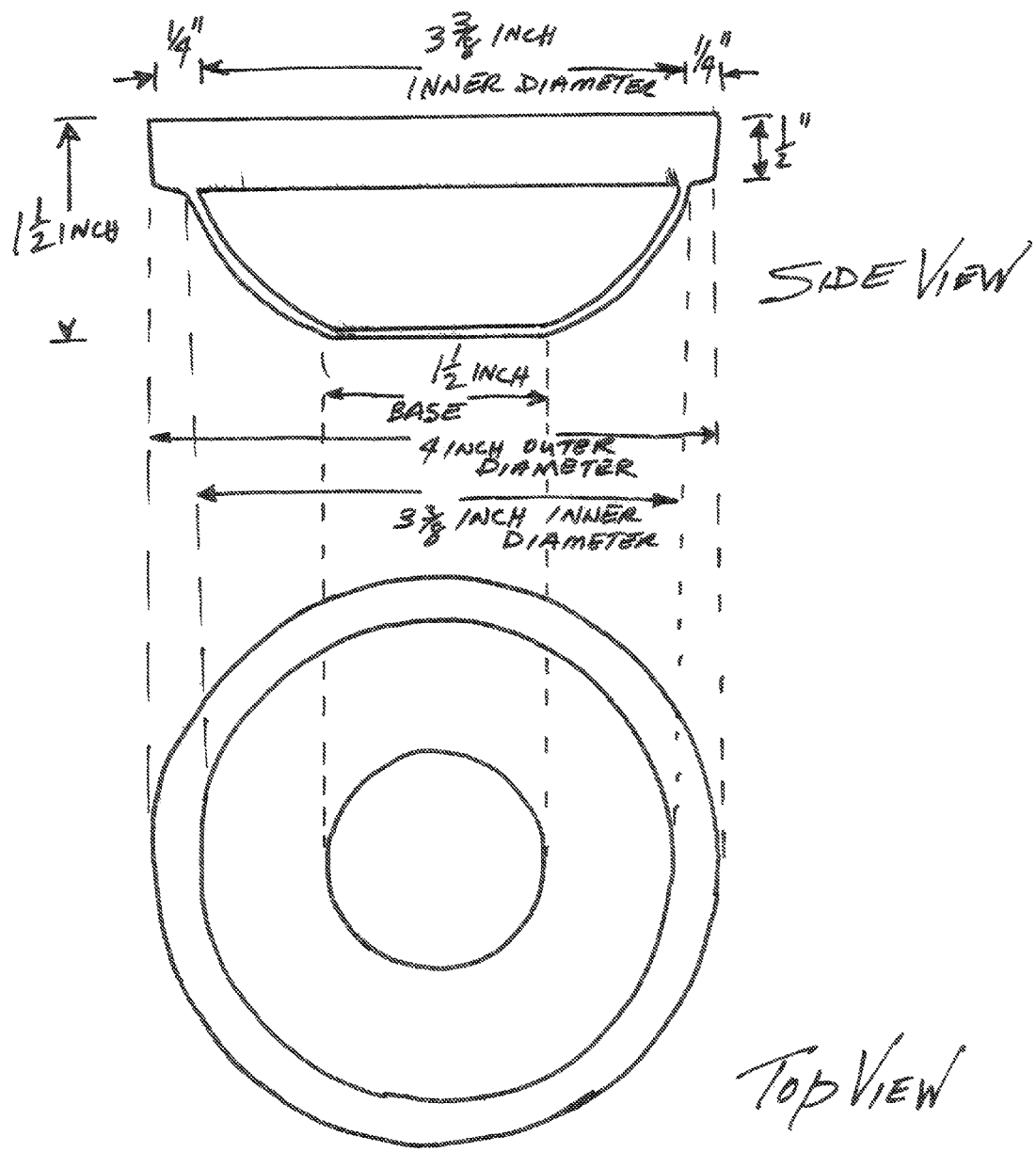

UNIVERSAL POT COVER HOLDER/LID HOLDER WITH SPOON REST

BACKGROUND OF THE INVENTION

To better understand the background behind the invention, consider this aged-old challenge when you are in the kitchen cooking and you remove your pot cover for whatever reasons, there is a question that must be answered: Where do you place the pot cover? and possible solutions could be any answer to one of these questions that follows:
  Do you rest it on your counter top (sometime upside down)?
  Do you hold it in one hand while using the other to stir?
  Do you sometimes stretch to place it in the sink?
  Do you rest it on top of another pot?
  Also, what do you do with the spoon after you have stirred your pot?
There is a single solution to all these question which will lead to the introduction of the universal pot cover holder with spoon rest.

It is not a secret that users of the kitchen or cooks everywhere have experienced the difficulties involved in handling a hot and dripping pot cover. The challenge as to where to put the pot cover has always been a problem. The choice is to put the pot cover on the counter top and if placed down, leaves a pool of water or a circle of what is cooking on the counter. Another solution is to place the cover upside down with the knob on the counter, which makes it difficult and can cause burns when ready to place it back on the pot. Another unsafe way is to hold the pot cover in one hand and stir the pot with the other hand and if vigorous stirring is required the use of two hands becomes necessary and is forced to place pot cover on counter top or surface. That action is dangerous which can lead to the pot to move from over the flame. Some cooks cannot be bothered with either option mentioned above and so the pot cover is placed in the sink or on top of another pot on the stove. What makes it even more challenging to the cook is if they are cooking multiple dishes and nowhere to place the second pot cover if they need to add or stir the pot.

Apart from the challenge of where to place the cover, there is also the challenge of where to place the variety of implements like the stirring spoons, forks or the like. Normally all the implements would have placed if not on the counter, in the sink if close by, placed on top of a pot on the stove or placed in another container with water. Problems and difficulties have been encountered when employing these procedures and there is food spillage or drippings on the counter that lead to mess.

Over the years, there are prior art that attempt to solve this aged old challenge that the cook faces in the kitchen and they have lack the sufficient functionality to care of all challenges stated above in one convenient design. The irregular shape of pot covers, their knobs and or handles have proven difficult for prior arts to solve the problem. No wonder there is presently no significant design that have market success.

Accordingly, a need remains for a kitchen utensil and pot lid holder in order to overcome the above-noted shortcomings. The present invention satisfies such a need by providing an apparatus that is easy to use, durable in design, effective in use, and practical and functional. Such an apparatus provides the user with a convenient holding place for a hot spoon or lid, which eliminates the mess. The apparatus also eliminates the need to hold a hot lid in one hand while trying to stir the contents of a pot with the other. With such a kitchen utensil and pot lid holder, a counter top remains free of spills and unwanted mess, while also preventing a person from burning their counter top surface or hands. The apparatus is appreciated for its convenience and ease of use by professionals in the culinary industry, as a well as everyday persons.

OBJECTS OF THE INVENTION

The object of the present invention to provide a pot cover holder which is universal in its use in that it can accommodate any pot cover of any material, with any knob or handle, any edge contour or configuration, stable support of pot covers, allow drippings from the cover to be collected in a glass bowl without messing counter top, can accommodate two pot covers at same time and can accommodate two stirring implements.

SUMMARY OF THE INVENTION

In view of the foregoing background, it is therefore an object of the present invention to provide a kitchen with a universal pot cover holder with spoon rest. Since most kitchen have different cook wares hence different pot covers, this invention takes care of the random placements of covers when not in immediate use. The uniquely spaced arches on the universal pot cover holder with spoon rest takes care of any knob or handle on any pot covers. When pot covers are placed on the present design, the user will not have to worry about the size of cover since the present design takes care of the diameter space that would have normally being used up on the counter as on the present design, pot covers rest upright. Stirring spoons when not in use, can conveniently be placed in the glass bowl that is position below. This glass bowl is removable and dishwasher safe. The drippings or condensate from the hot pot cover will be collected in the glass bowl which is removable.

BRIEF DESCRIPTION OF THE SEVERAL VIEWS OF THE DRAWING

The features of this invention are set forth with particularity in the claims. The invention itself, however, both as to its organization and method of operation, together with further objects and advantages thereof, may best be understood by reference to the following description taken in connection with the accompanying drawings in which:

FIG. 1 is a perspective angular frontal view showing the universal pot cover holder and the bowl aside that collects drippings from the pot cover;

FIG. 2 is a perspective view of the apparatus shown in FIG. 1, showing the glass bowl in its position according to the invention FIG. 3 is a side-elevation view of the apparatus shown in FIG. 2, showing the glass bowl in its position according to the invention FIG. 4 is a perspective top view of the apparatus shown in FIG. 2, showing the glass bowl in its position according to the invention FIG. 5 is a perspective side and top view of the glass bowl

DETAILED DESCRIPTION OF DRAWINGS

This apparatus has its members welded together with the exception of the removable glass bowl. The best way considered to describe this apparatus is start from base of the apparatus.

The universal pot cover holder with spoon rest consists of a circular base 7 (FIG. 1) connecting by weld to a curve upright member 5. Upright member 5 is connected to curved planar member 1. This curved planar member 1 is the core of this apparatus as this is where the pot cover sits/rest on. According to FIG. 3, planar member 1 is designed to be slightly tilt to the front which allows drippings from the pot cover to fall into the glass bowl 11. Upright member 5 is welded to member 1 more to the back of curve planar member 1 to create a hangover—FIG. 3. This will allow the drippings from the cover to fall into glass bowl 11. There are two arches 2 and 3 that are critically angled backwards connecting by welds to curved planar member 1. Both 2 and 3 have same height from curved planar member 1 and are symmetrical placed. However, the inner legs, members 3.1 and 2.1 are slightly longer than outer legs members 3.2 and 2.2.

Because of the space between the arches, any pot cover with any knob or handle will fit comfortably. Member 4 is welded to member 1 to prevent the pot cover from sliding off planar member 1. Below planar member 1 there is member 6 welded to member 5. This member 6 is referred to as the spoon rest. This is symmetrical bent backwards as shown in FIG. 3 and can accommodate two implements like stirring spoons and at the ends thereof are two rubber ends 6.1. As part of the spoon rest of this entire apparatus, there is member 9 (welded to member 5) that allows glass bowl 11 to be cradled see FIG. 3 and FIG. 2. This glass bowl 11 which is removable (see FIG. 1) serves two purposes:

1. To collect the drippings from the pot covers
2. To accommodate the spoon(s)

Member 8 serves as a vertical support for bowl cradle 9.

Glass bowl have flat base with diameter smaller than diameter bowl edge. Bowl edge is parapet to rest on member 9

PATENT REFERENCE CITED

| | | |
|---|---|---|
| 6,672,550 | January 2004 | Borodulin |
| D530,570 | October 2006 | Krueger |
| 6,672,550 | January 2004 | Borodulin |
| D476,847 | July 2003 | Kingsley |
| 6,585,200 | July 2003 | Borodulin |
| D401,496 | November 1998 | Lambert |
| D398,483 | September 1998 | Stocco |
| D369,052 | April 1996 | Mele |
| D362,778 | October 1995 | Mele |
| 5,297,766 | March 1994 | Hoffman |
| 5,246,195 | September 1993 | Huff |
| D265,622 | August 1982 | Bartels |
| 5,038,945 | August 1991 | Melkonian |
| 5,127,616 | July 1992 | Carney |
| 4,911,310 | March 1990 | Raishe |

I claim:

1. A universal pot cover holder with spoon rest comprising a base configured to rest upon a generally horizontal support surface;
a generally planar member that is curved downward to form an arc that is configured for a pot cover to rest upon the planar member;
two arches comprised of round bars tilted backwards are connected to a back edge of said planar member; said two arches each having an outer leg that is shorter than an inner leg with both the outer and inner legs being directly attached to the planar member; wherein a third arch formed of a curved round bar extends upwardly from a front edge of the generally planar member to form a stopper for the pot cover, preventing the pot cover from sliding off said planar member; wherein the third arch is smaller than the two arches;
and a curved upright post extending between and connecting the base to said planar member;
wherein said curved upright post is configured to tilt said pot cover frontwards to allow drippings to flow downwards toward the base.

2. The universal pot cover holder of claim 1, wherein the curved upright post is formed from a vertical round bar.

3. The universal pot cover holder of claim 1, wherein a generally horizontal bar is attached to the upright post at a mid-section thereof; wherein the generally horizontal comprises a rubber tip at each end of said generally horizontal.

4. The universal pot cover holder of claim 1, wherein a circular member is connected to and extends upwardly from the base; wherein a glass bowl sits in the circular member to store a stirring spoon or fork and collect drippings from the pot cover.

5. The universal pot cover holder of claim 3, wherein the horizontal bar is symmetrically curved backwards on both sides of said upright post.

6. The universal pot cover holder of claim 1, wherein the upright post is connected to the back of the planar member.

7. The universal pot cover holder of claim 1, wherein the base is circular shaped.

* * * * *